(12) United States Patent
Shapiro et al.

(10) Patent No.: US 8,976,937 B2
(45) Date of Patent: Mar. 10, 2015

(54) METHOD AND APPARATUS FOR COMMUNICATION BETWEEN A SECURITY SYSTEM AND A MONITORING CENTER

(75) Inventors: Steven Shapiro, Lake Worth, FL (US); Bernard I. Worst, Somerset, NJ (US); Michael E. Wilber, Highlands Ranch, CO (US)

(73) Assignee: ADT US Holding, Inc., Boca Raton, FL (US)

( * ) Notice: Subject to any disclaimer, the term of this patent is extended or adjusted under 35 U.S.C. 154(b) by 1491 days.

(21) Appl. No.: 12/147,896

(22) Filed: Jun. 27, 2008

(65) Prior Publication Data

US 2009/0323904 A1    Dec. 31, 2009

(51) Int. Cl.
*H04M 11/04* (2006.01)
*G08B 25/08* (2006.01)

(52) U.S. Cl.
CPC .............. *H04M 11/04* (2013.01); *G08B 25/08* (2013.01)
USPC ............................................. 379/39; 379/48

(58) Field of Classification Search
CPC ............ H04M 11/04; H04M 1/72541; H04M 2241/04; H04M 11/06; H04M 1/72536; H04M 2250/12; H04M 3/2281; H04M 3/42042; H04M 3/42195; H04M 3/5116; H04M 1/7253; H04W 76/007; H04W 24/04; G08B 25/10; G08B 25/016; G08B 25/009; G08B 13/19697
USPC ........... 379/32.01–48; 455/404, 404.1, 404.2, 455/521, 90.1, 414.1, 423, 433; 340/541, 340/506
See application file for complete search history.

(56) References Cited

U.S. PATENT DOCUMENTS

| | | | |
|---|---|---|---|
| 4,918,717 | A | 4/1990 | Bissonnette et al. |
| 7,158,026 | B2 | 1/2007 | Feldkamp et al. |
| 8,107,625 | B2 * | 1/2012 | Boland et al. ................... 380/37 |
| 2003/0002639 | A1 * | 1/2003 | Huie ........................ 379/114.27 |
| 2003/0141977 | A1 * | 7/2003 | Brown et al. ................. 340/574 |
| 2004/0203572 | A1 | 10/2004 | Aerrabotu et al. |
| 2007/0182540 | A1 * | 8/2007 | Marman ....................... 340/506 |
| 2008/0280587 | A1 * | 11/2008 | Hossein et al. ............ 455/404.2 |
| 2009/0009583 | A1 * | 1/2009 | Shepher ..................... 348/14.01 |

FOREIGN PATENT DOCUMENTS

| | | |
|---|---|---|
| CN | 1232237 A | 10/1999 |
| CN | 1732678 A | 2/2006 |

(Continued)

OTHER PUBLICATIONS

International Search Report/Written Opinion; Dated Dec. 1, 2009; International Application No. PCT/US2009/048084 (13 pages).

(Continued)

*Primary Examiner* — Akelaw Teshale
(74) *Attorney, Agent, or Firm* — Christopher & Weisberg, P.A.

(57) ABSTRACT

A method for providing communications between a system control panel at a premises and a central monitoring center comprises transmitting an event code from the control panel to the monitoring center utilizing a first communications format and a network protocol, and causing the control panel to enter a call-back mode. The control panel is enabled to receive in-bound calls utilizing a second communications format. A two-way voice session is established utilizing the second communications format between the monitoring center and the control panel. The two-way voice session is initiated by the monitoring center.

16 Claims, 3 Drawing Sheets

(56) References Cited

FOREIGN PATENT DOCUMENTS

EP 1708450 A2 10/2006
EP 1708450 A2 10/2006

OTHER PUBLICATIONS

Chinese Rejection Decision in both Chinese and its English translation dated Nov. 4, 2013 for corresponding Chinese National Stage Application Serial No. 200980124100.2, Chinese National Stage Entry Date: Jun. 22, 2009, consisting of 13 pages.

1st Chinese Examination Report and Search Report in both Chinese and its English translation dated Nov. 21, 2012 for corresponding Chinese National Stage Application Serial No. 200980124100.2, Chinese National Stage Entry Date: Jun. 22, 2009 consisting of 21 pages.

2nd Chinese Examination Report and Search Report in both Chinese and its English translation dated Jul. 2, 2013 for corresponding Chinese National Stage Application Serial No. 200980124100.2, Chinese National Stage Entry Date: Jun. 22, 2009 consisting of 20 pages.

* cited by examiner

METHOD AND APPARATUS FOR COMMUNICATION BETWEEN A SECURITY SYSTEM AND A MONITORING CENTER

BACKGROUND OF THE INVENTION

This invention relates generally to security systems, and more particularly to communication between a monitoring station and a customer premises.

Customers often have security systems installed in their homes and/or businesses to monitor for events such as unauthorized entry and fire. Each security system has at least one control panel that communicates with a central monitoring center. The control panel contacts the central monitoring center when an event is detected.

Currently, the control panel and the central monitoring center communicate over standard hard-wired connections such as POTS (plain old telephone service) to transmit both data and voice information. However, traditional physical lines and connections may be disabled from outside the premises, either on purpose or as a result of accident or weather, resulting in unreliable, communication between the control panel and the central monitoring center. Also, a traditional physical line may not be available as many customers are moving away from hard-wired connections, opting instead for wireless capability such as cellular phones.

Therefore, a need exists for reliable wireless communications between the control panel and the central monitoring center.

BRIEF DESCRIPTION OF THE INVENTION

In one embodiment, a method for providing communications between a system control panel at a premises and a central monitoring center comprises transmitting an event code from the control panel to the monitoring center utilizing a first communications format and a network protocol, and causing the control panel to enter a call-back mode. The control panel is enabled to receive in-bound calls utilizing a second communications format. A two-way voice session is established utilizing the second communications format between the monitoring center and the control panel. The two-way voice session is initiated by the monitoring center.

In another embodiment, a security system comprises a system control panel located, at a premises and a central monitoring center located remote from the premises. The system control panel comprises a first transceiver configured to utilize a first communications format to transmit an event code and an audio input configured to receive signals representative of sound within the premises. The first transceiver is further configured to utilize a second communications format. The central monitoring center comprises a second transceiver that is configured to receive the event code from the system control panel utilizing the first communications format. The central monitoring center initiates a voice session with the system control panel utilizing the second communications format after receiving the event code.

In yet another embodiment, a system control panel for monitoring a plurality of security devices installed at a premises and for communicating with a central monitoring center located remote from the premises comprises a control module, an audio input and a communicator module with SIM module. The control module is configured to detect event data associated with a security device. The audio input is configured to receive signals representative of sound within the premises. The communicator module comprises a system identifier identifying the system control panel and is configured to utilize first and second communications formats to enable communications. The transceiver is configured to transmit data utilizing the first communications format and at least one of voice and data utilizing the second communications format. The transceiver is further configured to transmit an event code to the central monitoring center utilizing the first communications format. The system control panel enters a call-back mode after tile event code is transmitted to enable a voice session with the central monitoring center utilizing the second communications format.

DETAILED DESCRIPTION OF THE INVENTION

Figure 1:
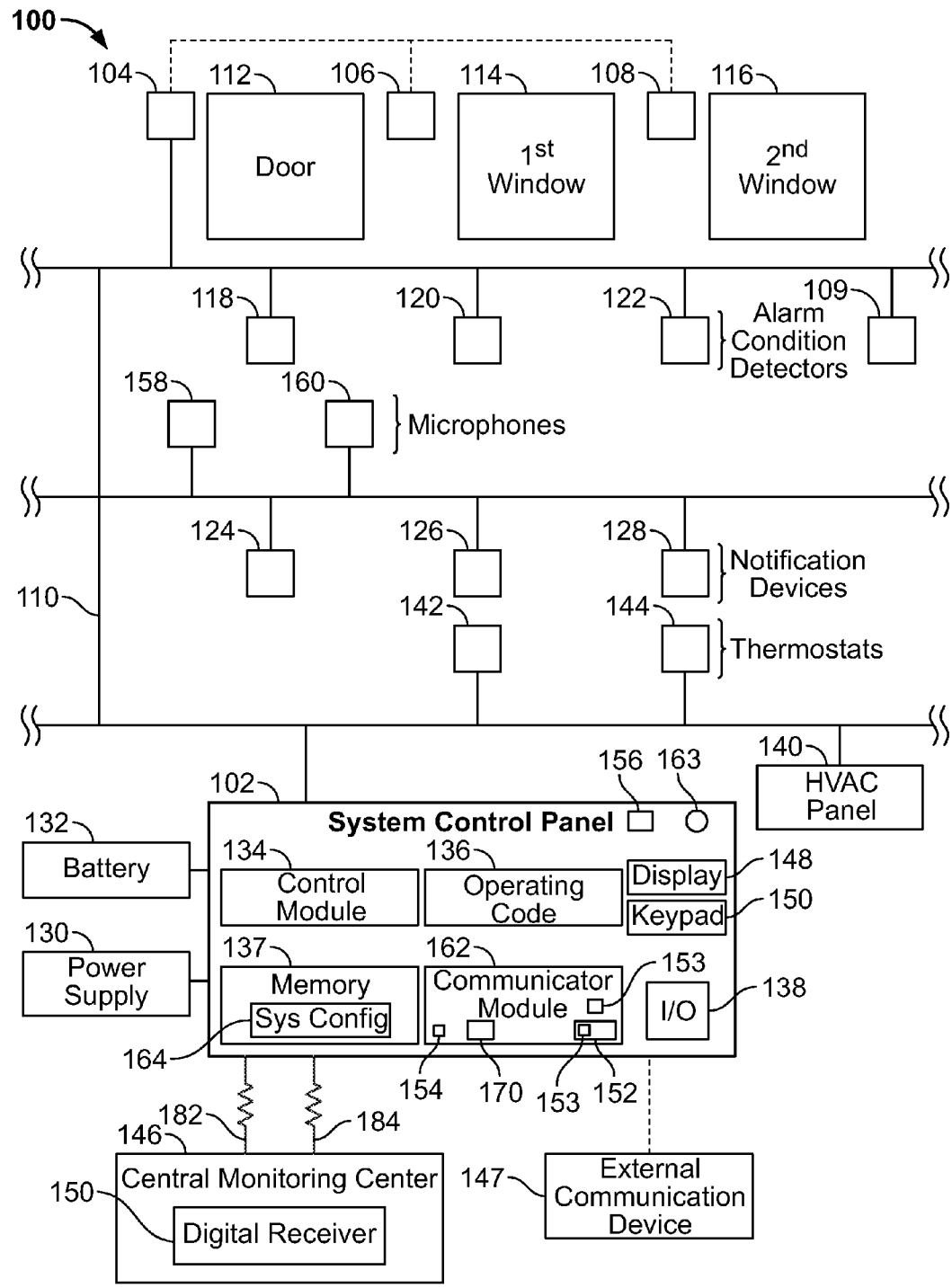
FIG. 1 illustrates a security system that has a system control panel for monitoring and/or controlling devices and components installed on a network in accordance with an embodiment of the present invention.

The foregoing summary, as well as the following detailed description of certain embodiments, of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the program may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present, invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 illustrates a security system 100 that has a system control panel 102 for monitoring and/or controlling devices and components installed on a network 110. Portions or the entirety of the network 110 may be wireless. The devices may detect and/or control door and window openings and closings, detect alarm conditions, notify people within an area about alarm conditions, track and/or control temperature, or accomplish other functions that may be desired. For example, the system 100 may be used within a boat, office suite, industrial building, residence and the like. It should be understood that not all of the devices may be installed within each security system The system 100 has one or more sensors, such as first sensor 104, second sensor 106, through N sensor 108 which may be configured to control and/or monitor door 112, first window 114 and second window 116, respectively, and are interconnected with the system control panel 102 over the network 110. One or more motion detectors 109 may be used to sense motion and other sensors (not shown) may be used to monitor other areas of interest. Each of the sensors 104, 106, 168, and 109 may have a unique address on the network 110.

Alarm condition detectors 118, 120 and 122 may be connected on the network 110 and are monitored by the system control panel 102. The detectors 118-122 may detect fire, smoke, temperature, chemical compositions, or other hazardous conditions. When an alarm condition is sensed, the system control panel 102 transmits an alarm signal to one or more addressable notification devices 124, 126 and/or 128 through the network 110. The addressable notification devices 124, 126 and 128 may be horns and/or strobes, for example. An optional heating, ventilation and air-conditioning (HVAC) panel 140 and one or more thermostats 142 and 144 may also be communicating with the system control panel 102 on the network 110.

A central monitoring center 146 may receive communications from the system control panel 102 regarding security problems and alarm conditions. The central monitoring center 146 is located remote from the system 100 and provides monitoring to many alarm systems. Communications from the system control panel 102 may be received and processed by a digital receiver 150. The digital receiver 150 may be located at or remote from the central monitoring center 146, and may provide error checking and formatting functions prior to conveying the information to the central monitoring center 146.

The system control panel 102 is connected, to a power supply 130 that provides one or more levels of power to the system 100. One or more batteries 132 may provide a back-up power source for a predetermined period of time in the event of a failure of the power supply 130 or other incoming power. Other functions of the system control panel 102 may include showing the status of the system 100, resetting a component, a portion, or all of the system 100, silencing signals, turning off strobe lights, and the like.

The system control panel 102 has a control module 134 that provides control software and hardware to operate the system 100. Operating code 136 may be provided on a hard disk, ROM, flash memory, stored and run on a CPU card, or other processing device. An input/output (I/O) port 138 may provide a communications interface at the system control panel 102 to communicate with an external communication device 147 such as a laptop computer.

The network 110 is configured to carry power and communications to the addressable notification devices 124-128 from the system control panel 102. Each addressable notification device 124-128 has a unique address and may be capable of bi-directional communication with the system control panel 102. The addressable notification devices 124-128 may communicate their status and functional capability to the system control panel 102 over the network 110. The thermostats 142 and 144 may be controlled and monitored by the control module 134.

A communicator module 162 may be provided within and/or interconnected with the system control panel 102. A subscriber identity module (SIM) 152 may be installed in the communicator module 162. In other embodiments, a universal subscriber identity module (USIM) (not shown) or a removable user identity module (RUIM) (not shown) may be used. The communicator module 162 may have a transceiver (TRx) 170 that enables wireless data and voice transmissions as well as the ability to both initiate and receive phone calls. In some embodiments, the communicator module 162 may be a Global System for Mobile Communications (GSM) Cellular Radio or other type of cellular radio. Each communicator module 162, or GSM Cellular Radio, has a unique system identifier (ID) 153. If the SIM 152 is used, the system ID 153 may be provided by the SIM 152. For example, the SIM 152 may be provided by a wireless service provider, the supplier of the control panel 102, supplier of the communicator module 162, the operator of the central monitoring center 146 and the like. Alternatively, the system ID 153 may be stored in memory 137. The system ID 153 is a unique character string, such as a phone number, a wireless SIM ID, internet protocol (IP) address, or a media access control (MAC) address, and may be used to identify and/or authenticate the system 100. Connection information 154 is provided, which may be a phone number, IP address or MAC address of the central monitoring center 146. It should be understood that the functionality and information stored within the SIM 152 may be implemented in other hardware, software and/or firmware within the control panel 102.

The system control panel 102 and the central monitoring center 146 may communicate data utilizing a first communications format 182 over a data channel. The first communications format 182 may be a data format. The data may be communicated in a wireless or cellular data format, or over a wired connection, such as over the Internet. The data may be transmitted in packets without establishing a session that connects the control panel 102 and the monitoring center 146. A session, for example, may establish a link, such as a phone call, connecting the control panel 102 and the monitoring center 146 that is maintained until either the control panel 102 or monitoring center 146 disconnects to stop the session. Examples of standards and/or technologies, that may be used to convey data over a data channel are General Packet Radio Service (GPRS), Enhanced Data Rates for GSM evolution (EDGE), Evolution-Data Optimized (EVDO), 1xRTT, Integrated Digital Enhanced Network (iDEN), voice over IP (VoIP), and the like.

Voice and control data, such as commands sent from the central monitoring center 146 to control the control panel 102, may be communicated utilizing a second communications format 184 over a different one-way or two-way voice channel, establishing a one-way or two-way voice session. The second communications format 184 may be a voice format. The voice and control data may be communicated in a wireless voice format or over a wired connection. A one-way voice session establishes a link in which sound is transmitted in one direction such as from the control panel 102 to the central monitoring center 146. A two-way voice session establishes a link in which sound is transmitted in both directions, such as to allow a conversation between the two locations. Examples of standards and/or technologies that may be used to convey one-way and two-way voice sessions are Global System for Mobile Communications (GSM), Code Division Multiple Access (CDMA), Voice Interoperability Data Access (VIDA), Time Division Multiple Access (TDMA), VoIP, Worldwide Interoperability for Microwave Access (WiMAX), Wireless Fidelity (Wi-Fi), Long Term Evolution (LTE) and the like.

For example, alarm codes, the system ID 153 and other premises specific or premises status data information may be transmitted with specific formatting and timing. If an alarm from the control panel 102 is not received by the monitoring center 146, the monitoring center 146 cannot provide the appropriate response such as the dispatch of appropriate emergency personnel. Cellular voice communication, the quality of which often relies on cellular signal strength, may be unreliable for transmitting data such as the alarm codes and system ID 153 as environmental issues and the number of users currently using the cellular system, as well as other factors, may impact the transmission reliability, resulting in, for example, dropped or delayed packets. Therefore, in one embodiment, a different data channel is used for the transmission of data.

The central monitoring center 146 may call the control panel 102 utilizing the second communications format 184 to establish a voice session over a voice channel. When a voice channel is open, an audio input such as a microphone 156 may detect sound proximate to the system control panel 102 that may be transmitted to the central monitoring center 146. Optionally, the microphone 156 may be remote from the control panel 102, where the control panel 102 simply receives audio signals (e.g., voice) from a remote source or person(s). In some embodiments, one or more additional microphones 158 and 160 may be placed within the premises and connected to the network 110. Detected sounds are transmitted from the microphones 158 and 160 over the network 110 to the system control panel 102, where the sounds may be transmitted over the voice channel to the central monitoring center 146. A speaker 163 at the system control panel 102 allows a person at the premises to hear voice communication from the central monitoring center 146. In some embodiments, a wired or wireless handset (not shown) may be provided at the control panel 102.

The control panel 102 may also use the communicator module 162 and the first and second communications formats 182 and 184 to accomplish maintenance and upgrade features of the system 100, such as to download a firmware upgrade from a server (not shown) that may be located at the monitoring center 146 or service provider, or to enroll a new device (not shown) that is installed on the network 110. For example, specific operational parameters may be downloaded to the new device and/or the control panel 102 for controlling and monitoring the device.

Figure 2:
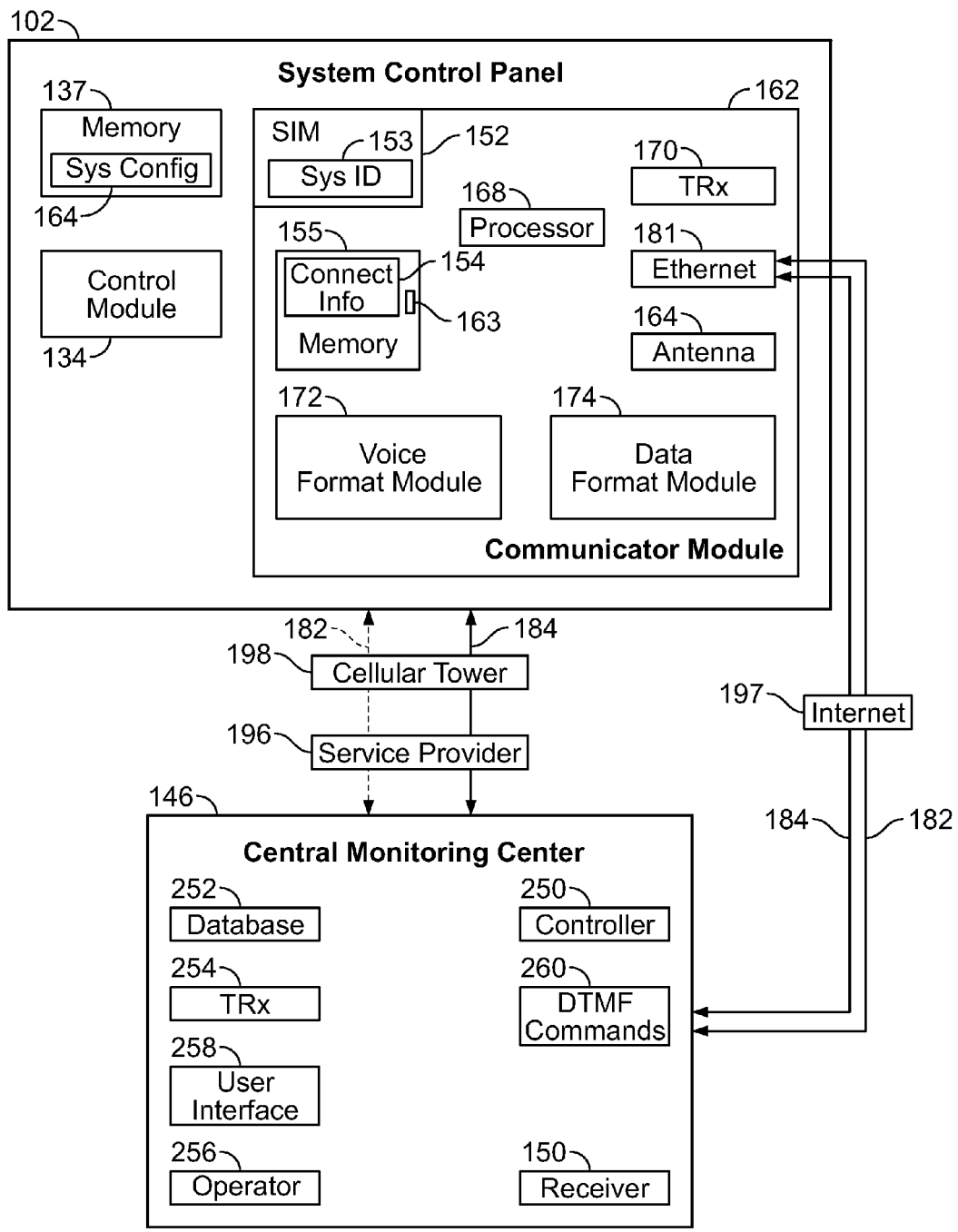
FIG. 2 illustrates the communication between the system control panel and the central monitoring, center in accordance with an embodiment of the present invention.

FIG. 2 illustrates the communication between the system control panel 102 and the central monitoring center 146. Within the communicator module 162, a memory 155 may be used to store data such as the connection information 154 to communicate with the central monitoring center 146. An antenna 164 may be used to facilitate wireless communication.

The communicator module 162 and/or other module(s) in the system control panel 102 may provide a plurality of communication formats for communicating over a plurality of communication standards and/or technologies, at least some of which are wireless. In some embodiments, the available communication technologies may be determined by the SIM 152 and associated wireless service provider 196. In other embodiments, the available communication technologies may be determined by one or both of the: wireless service provider 196 and an internet service provider. The TRx 170 may be capable of utilizing at least one data format and at least one voice format. A voice format module 172 and a data format module 174 are provided. A processor 168 within the communicator module 162 processes the transmission data into the desired format prior to transmitting and processes the received data for use by the system control panel 102.

For example, GSM and GPRS work together and may be utilized in one embodiment. In GPRS, a packet mode format is utilized in which packets having a common constant length correspond to a GSM time slot. It should be understood that in other data formats, a packet mode format may be used that does not utilize packets having a common constant length. Multiple users may share the same frequency channel in GPRS, and the packets may be scheduled for transmission based on first-come first-served packet scheduling or other scheduling schemes. EDGE also works together with GSM. In another embodiment, a different service provider may provide CDMA with EVDO and/or 1xRTT. The first communications format 182 is a format that may be associated with technologies such as GPRS, EDGE, EVDO, VoIP, and 1xRTT, while the second communications format 184 is a format that may be associated with technologies such as GSM, CDMA, VIDA, TDMA, VoIP, WiMAX and Wi-Fi. It should be understood that the communications formats are exemplary and not limiting, and thus other communications formats may be used. Also, a first communications format 182 may be provided by a first service provider, while the second communications format 184 is provided by a second service provider. In this case, a second SIM (not shown) or other identity module may be used, or a second system ID may be stored in the memory 155, if needed.

Premises status and premises specific data, such as alarm events, the system ID 153, event code(s) and/or supervisory data messages are transmitted by the TRx 170 utilizing the first communications format 182 within the data format module 174. If, for example, the control panel 102 does not receive an acknowledgement from the monitoring center 146 in response to a supervisory data message, the control panel 102 may resend the supervisory data message utilizing a different communications format. Voice and control data are transmitted by the TRx 170 utilizing the second communications format 184 within the voice format module 172. For wireless communication, the data and voice information may be transmitted to one or more cellular towers 198 and transferred over networks by one or more service provider 196. For voice communications, the service provider 196 establishes the one-way or two-way communications link or voice session between the control panel 102 and the monitoring center 146.

An Ethernet module 181 may also be provided within the control panel 102 to provide access to broadband internet service over the Internet 197 that may be either wireless or hard-wired. The Ethernet module 181 may be used to send voice and/or data communications, such as by using VoIP.

The central monitoring center 146 has a controller 250 for controlling operations and a database 252. The database, 252 may include, identification information for identifying a system 100 that is sending an alarm. TRx 254 utilized the first and second communications formats 182 and 184 to communicate with the system 100 and other alarm systems (not shown). An operator 256 uses a user interface 258 to review communications from the control panel 102, send commands to remotely control the control panel 102, listen to sound detected at the control panel 102, and engage in two-way voice communication with a person at the control panel 102.

Figure 3:
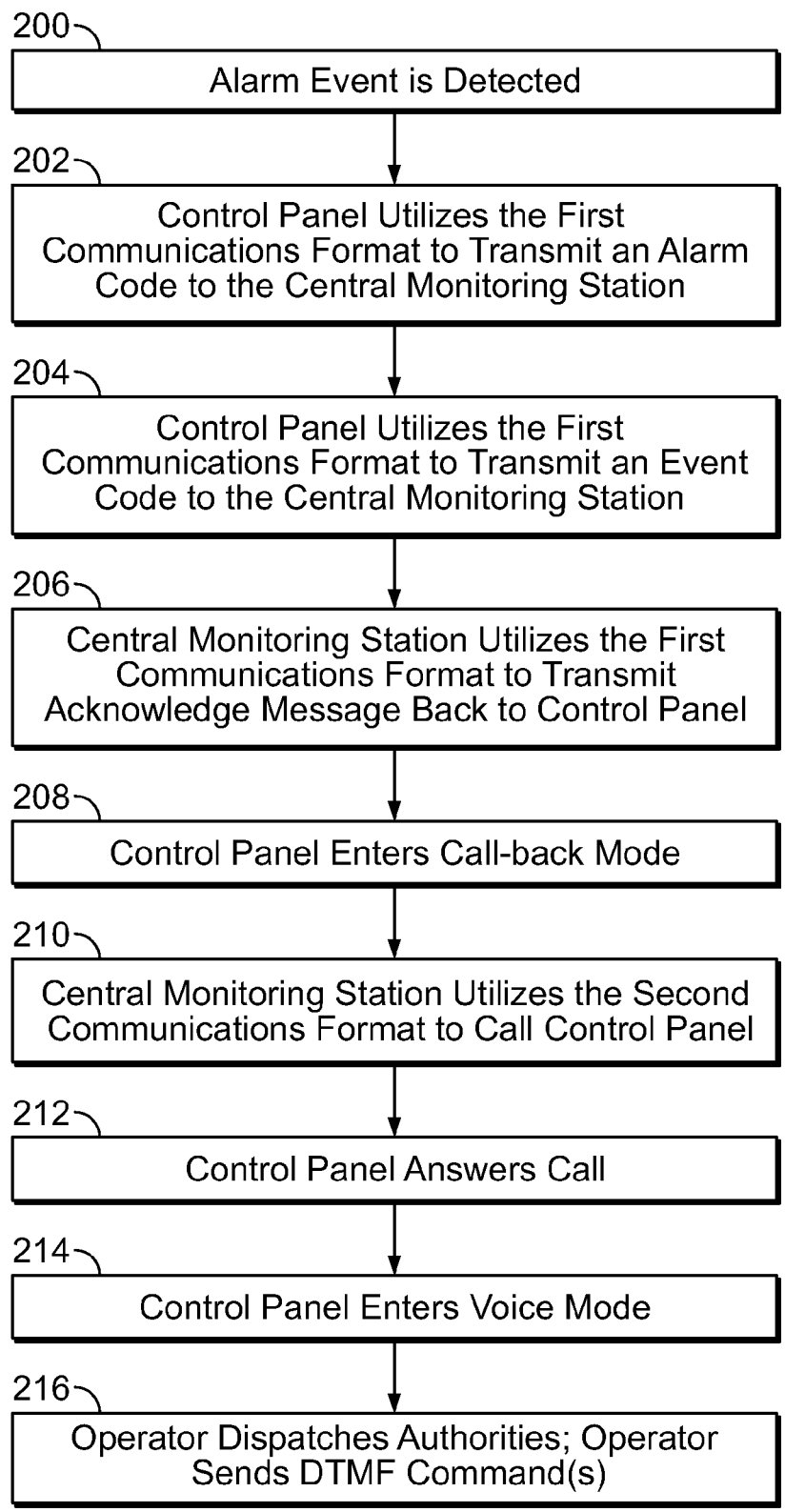
FIG. 3 illustrates a method for voice communication between the system control panel and the central monitoring center when an alarm event is detected in accordance with an embodiment of the present invention.

FIG. 3 illustrates a method for communication between the system control panel 102 and the central monitoring center 146 when an alarm event is detected. At 200, the system control panel 102 at the premises detects an alarm event. By way of example only, the alarm event may be an unauthorized entry through the door 112 breaking glass detected by one of the sensors 106 and 108 near the windows 114 and 116, detection of smoke, and the like.

At 202, the system control panel, 102 utilizes the first communications format 182 to transmit an alarm code to the central monitoring center 146. For example, the processor 1,68 and the TRx 170 within the communicator module 162 may prepare and transmit the system ID 153 and premises status or premises specific data (e.g., one or more alarm codes) using a technology such as GPRS and using a network protocol such as IP protocol. The alarm code may be used to indicate the type of alarm event that was detected. At 204, the system control panel 102 utilizes the first communications format 182 to transmit an event code to the central monitoring center 146. The event code indicates that the control panel 102 wishes to enter into a call-back mode. The call-back mode enables the control panel 102 to receive a call from the central monitoring center 146 utilizing the second communications format 184. When the control panel 102 is not in the call-back mode, the control panel 102 may not respond to calls from the central monitoring center 146 that utilize the second communications format 184. In one embodiment, calls that do not originate from the central monitoring center 146 may be ignored by the control panel 102. In one embodiment, the alarm code and event code may be transmitted as a single message or data packet.

By way of example only, GPRS or other data communications technologies as discussed above transmit the alarm code and event code in a manner that preserves the precise timing and order of packets. The central monitoring center 146 uses the alarm and event codes to correctly identify the system 100 and the type of event being reported. The TRx 170 transmits the data silently, and thus no audible tones are heard at the system control panel 102.

The central monitoring center 146 receives, with the TRx 254, the alarm and event codes transmitted utilizing the first communications format 182. As discussed previously, the alarm and event codes may initially be received and processed by the receiver 150. For example, the receiver 150 may perform error checking. If the receiver 150 determines that erroneous data has been received, the receiver 150 may sent a request utilizing the first communications format 182 to the system control panel 102, requesting that the alarm and event codes be retransmitted.

At 206, the central monitoring center 146 utilizes the first communications format 182 to transmit an acknowledge message or signal back to the system control panel 102 to indicate receipt of the alarm and event codes. At this point, an operator 256 at the central monitoring center 146 may be alerted to the situation at the premises monitored by the system 100. For example, a window alert may pop up on a display screen within the user interface 258 to alert the operator 256, or an audible alert may be sounded. The operator 256 may be provided with information identifying the premises as well as the type of alarm detected at the premises.

In one embodiment, if the control panel 102 does not receive an acknowledge message, the control panel 102 may utilize the first communications format 182 to retransmit the alarm and event codes. In another embodiment, if the control panel 102 does not receive an acknowledge message, the control panel 102 may retransmit the alarm and event codes utilizing a different communications format. In yet another embodiment, if the control panel 102 does not receive an acknowledge message, the control panel 102 may continue to utilize the first communications format 182 to transmit the alarm and event codes or a different communications format for a period of time. Alternatively, the control panel 102 may continue to transmit the alarm and event codes until an acknowledge message is received or the control panel 102 has reached its predetermined number of attempts, canceling the transmission. In yet another embodiment, the control panel 102 may transmit only the event code, indicating that a person at the control panel 102 wishes to enter into voice communications with the monitoring center 146. For example, the control panel 102 may have a button or other interface (not shown) that may be pressed or activated to initiate voice communications with the monitoring center 146.

At 208, after the acknowledge message is received, the system control panel 102 enters the call-back mode wherein the transceiver 170 in the communicator module 162 is in a receive mode, enabling the detection of in-bound calls utilizing the second communications format 184 from the central monitoring center 146 for a period of time. The period of time may be between two and three minutes, for example. In another embodiment, the system control panel 102 may enter the call-back mode after sending the event code and prior to receiving the acknowledge message. In yet another embodiment, the call-back mode may enable one of a one-way voice session and a two-way voice session.

At 210, the central monitoring center 146 utilizes the second communications format 184 to call the control panel 102. For example, the phone number associated with the system ID 153 may be stored in the database 252. The central monitoring center 146 may automatically tall the control panel 102, or the operator 256 may make a selection on the user interface 258 to initiate the call-back. For example, the operator 256 may select a specific key on a keyboard, select an icon, call-back box or other indication on a touch screen or select the call-back box with a mouse click selection. In one embodiment, the TRx 254 transmits in a format associated with GSM. For example, the service provider 196 may establish a connection between the control panel 102 and the central monitoring center 146, such as by assigning a pair of up-link and down-link frequency channels to each of the central monitoring center 146 and the control panel 102 to carry the voice session. For example, the up-link and down-link frequency channels may be assigned within the 850 MHz or 1900 MHz bands in the United States and within the 900 MHz or 1800 MHz bands in some other countries. In another embodiment, a telephony interface (not shown) or service, such as private automated branch exchange (PABX), may be used to facilitate the connection of the call to the service provider 196.

At 212, the system, control panel 102 answers the voice channel call from the central monitoring center 146, such as on a first in-bound ring event, and the service provider 196 establishes a connection between the control panel 102 and the monitoring center 146. The first in-bound ring event is the first detection of a call utilizing the second communications format 184 from the central monitoring center 146. Continuing the example above, the processor 168 processes the call based on GSM. When an in-bound ring event is received at the premises where the system 100 is installed, the control panel 102 does not generate an audible ring at the premises. Therefore, if an unauthorized person has entered the premises, the operator 256 may detect their presence without the unauthorized person becoming aware that they are being monitored. In one embodiment, if the control panel 102 does not receive an in-bound ring event within the time period, the control panel 102 may again transmit the alarm and event codes, resetting the time period. In another embodiment, the control panel 102 may utilize a different communications technology, such as VoIP, to attempt to establish communication with the monitoring center 146.

At 214 the system control panel 102 enters a voice mode. In one embodiment, the voice mode is a two-way voice transmission node, utilizing the second communications format 184 to transmit voice and other sound transmission in both directions. In another embodiment, the voice mode is a "listen-only state", which is a one-way voice transmission mode. The one-way voice transmission mode allows the operator 256 at the monitoring center 146 to hear sound that is detected by one or more of the microphones 156, 158 and 160 at the premises. The operator 256 may thus be able to determine activity at the premises, such as to determine if a person is in physical danger and/or asking for help. In the one-way voice transmission mode, no sound is transmitted from the monitoring center 146 to the system control panel 102.

At 216 the operator 256 may take a number of different actions. The operator 256 may keep a one-way voice session open, continuing to listen while, for example, dispatching local authorities. In another embodiment, the operator 256 may use user interface 258 to transmit one or more dual-tone multi-frequency (DTMF) commands 260 to remotely control the control panel 102. For example, a DTMF command 260 may be sent to change the voice mode from one-way to a two-way voice transmission mode, such as voice operated switch (VOX), to establish a two-way voice session. The operator 256 may then have a conversation with a person located oh the premises. Other DTMF commands 260 may also be used, such as to change the voice transmission mode from the two-way mode to the one-way mode, magnify the sound detected by the microphone 156, extend the time of the call, disconnect or terminate the voice connection, and the like. Both the one-way and two-way voice sessions may be terminated by the central monitoring center 146 without generating a noise at the system control panel 102. The DTMF commands, 260 may be logged in the memory 155 of the control panel 102. It should be understood that other types of commands may be transmitted utilizing the second communications format 184 to remotely control the system control panel 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method for providing communications between a control panel at a premises and a monitoring center remote from the premises, the method comprising:
    sensing an alarm event at the premises;
    causing, in response to the sensing of the alarm event at the premises, the control panel to:
        signal, using a first communication format, the monitoring center regarding the alarm event at the premises; and
        enter a call-back mode to enable the control panel to receive in-bound calls from an operator at the monitoring center after the signaling to enable a two-way voice session; and
    establishing the two-way voice session configured to provide two-way voice communication between an operator at the monitoring center and a user at the control panel, wherein the two-way voice session is initiated by the monitoring center via a second communication format different from the first communication format.

2. The method of claim 1, wherein the second communication format for the two-way voice session utilizes one of Global System for Mobile Communications (GSM), Code Division Multiple Access (CDMA), Voice over IP (VoIP), WiMAX, Wi-Fi, Time Division Multiple Access (TDMA), Integrated Digital Enhanced Network (iDEN), and Long Term Evolution (LTE).

3. The method of claim 1, wherein the signaling of the monitoring center includes transmitting an alarm event code from the control panel to the monitoring center utilizing the first communication format and a network protocol, the first communication format is associated with one of General Packet Radio Service (GPRS), Enhanced Data Rates for GSM evolution (EDGE), 1xRTT, evolution-data optimized (EVDO), iDEN, and VoIP.

4. The method of claim 3, wherein the first communication format constitutes a packet mode format.

5. The method of claim 3, wherein the two-way voice session initiated by the monitoring center comprises automatically calling the control panel upon receipt of the alarm event code.

6. The method of claim 3, wherein the alarm event code indicates that the control panel is entering a two-way voice call-back mode.

7. The method of claim 1, wherein establishing the two-way voice session comprises making an outbound call to the control panel based on a pre-assigned phone number associated with the control panel.

8. The method of claim 1, wherein the control panel enters the call-back mode upon receiving an acknowledge message from the monitoring center acknowledging that the monitoring center has received the event code.

9. The method of claim 1, further comprising providing the operator at the monitoring center with information identifying the control panel at the premises.

10. The method of claim 1, further comprising placing the control panel in a listen-only state for a predetermined period of time once the two-way voice session is established.

11. The method of claim 1, wherein the control panel enters an in-bound call enabled state at the enabling of the control panel to receive in-bound calls and maintains the in-bound call enabled state until the first of establishing the two-way voice session and a time period expires.

12. A control panel for monitoring a plurality of security devices installed at a premises for communicating with a central monitoring center located remote from the premises, the control panel comprising:
    a control module configured to detect alarm event data associated with a security device;
    a communicator module configured to utilize first and second communications formats to enable communications, the communicator module comprising a system identifier (ID) identifying the control panel; and a transceiver configured to:
> transmit the alarm event data utilizing the first communication format and at least voice utilizing the second communication format different from the first communication format; and
> transmit an alarm event code to the central monitoring center utilizing the first communication format, the control panel entering a call-back mode after the event code is transmitted to enable a two-way voice communication session with an operator at the central monitoring center utilizing the second communication format.

13. The control panel of claim 12, wherein the control panel enters the call-back mode after receiving an acknowledgment message utilizing the first communication format from the central monitoring center.

14. The control panel of claim 12, wherein the transceiver transmits an alarm code based on the event data detected by the control module, the alarm code comprising at least the system ID, the alarm code and the event code being transmitted as a substantially constant stream.

15. The system control panel of claim 12, wherein the transceiver is further configured to wait in the call-back mode for a time period, the transceiver retransmitting the alarm event code if an incoming call from the central monitoring station is not detected during the time period.

16. A method of processing an alarm at a premises, the method comprising:
sensing the alarm at the premises;
signaling the alarm from the premises to a monitoring center using a first network interface under control of a processor;
entering a call-back mode at the premises to enable receipt of in-bound calls after the signaling; and
initiating, from the monitoring center and in response to the signaling, a two-way cellular network call to a cellular network address identifying an audio station to network interface at the premises, the audio station to network interface including:
a second network interface;
a radio; and
control logic which operates independently of the processor;
using the control logic and the radio to establish a radio channel from the audio station to network interface to a selected one of a plurality of audio stations at the premises, the selected one of the plurality of audio stations including at least one of a speaker and a microphone, and a radio interface; and
using the control logic to bridge the radio channel to the cellular network call to establish a two-way audio channel from the selected one of the plurality of audio stations to the monitoring center.

\* \* \* \* \*